US011274685B2

(12) United States Patent
Friman et al.

(10) Patent No.: US 11,274,685 B2
(45) Date of Patent: Mar. 15, 2022

(54) ACTUATOR OF A PROCESS DEVICE HAVING A CONTROLLER CONFIGURED TO OPERATE IN A MEASURED POSITION FEEDBACK MODE AND A SIMULATED POSITION FEEDBACK MODE

(71) Applicant: METSO FLOW CONTROL OY, Vantaa (FI)

(72) Inventors: Mats Friman, Tampere (FI); Pasi Heikkinen, Espoo (FI)

(73) Assignee: NELES FINLAND OY, Vantaa (FI)

( * ) Notice: Subject to any disclaimer, the term of this patent is extended or adjusted under 35 U.S.C. 154(b) by 420 days.

(21) Appl. No.: 16/334,282

(22) PCT Filed: Sep. 21, 2016

(86) PCT No.: PCT/FI2016/050655
§ 371 (c)(1),
(2) Date: Mar. 18, 2019

(87) PCT Pub. No.: WO2018/055229
PCT Pub. Date: Mar. 29, 2018

(65) Prior Publication Data
US 2019/0390691 A1 Dec. 26, 2019

(51) Int. Cl.
*F15B 19/00* (2006.01)
*F15B 21/08* (2006.01)

(52) U.S. Cl.
CPC .......... *F15B 19/005* (2013.01); *F15B 19/007* (2013.01); *F15B 21/082* (2013.01);
(Continued)

(58) Field of Classification Search
None
See application file for complete search history.

(56) References Cited

U.S. PATENT DOCUMENTS 5,233,512 A    8/1993  Gutz et al.
5,486,997 A *  1/1996  Reismiller ........... G05B 13/026
                                                        700/45
(Continued)

FOREIGN PATENT DOCUMENTS

CA    2 917 240 A1    9/2016
CN    101688478 A     3/2010
(Continued)

OTHER PUBLICATIONS

Mar. 7, 2017 International Search Report isssused in International Patent Application No. PCT/FI2016/050655.
(Continued)

*Primary Examiner* — Peter J Macchiarolo
*Assistant Examiner* — Jermaine L Jenkins
(74) *Attorney, Agent, or Firm* — Oliff PLC

(57) ABSTRACT

A controller for controlling a pneumatic or hydraulic actuator of a process device includes a position feedback signal input for receiving a measured position signal representing a position of the actuator or the process device, an actuator pressure output, and a pressure sensor for measuring the actuator pressure. The controller is configured to operate in a measured position feedback mode and a simulated position feedback mode. In the measured position feedback mode the actuator is controlled dependent on a setpoint position and the measured position, and in the simulated position feedback mode the actuator is controller based on the setpoint position and a simulated position of the actuator or the process device. The simulated position is derived from the measured actuator pressure by a simulation model.

15 Claims, 4 Drawing Sheets

(52) U.S. Cl.
CPC ..... *F15B 21/087* (2013.01); *F15B 2211/6313* (2013.01); *F15B 2211/6656* (2013.01); *F15B 2211/6658* (2013.01)

(56) References Cited

U.S. PATENT DOCUMENTS

| | | | | |
|---|---|---|---|---|
| 5,829,335 | A * | 11/1998 | Ewald | D01G 19/26 91/363 A |
| 6,216,456 | B1 * | 4/2001 | Mitchell | E02F 9/2217 417/212 |
| 7,222,016 | B2 | 5/2007 | Snowbarger et al. | |
| 9,435,357 | B2 * | 9/2016 | Baker | B64D 29/06 |
| 10,144,501 | B2 * | 12/2018 | Fabre | G05D 1/0825 |
| 10,626,803 | B2 * | 4/2020 | Selstad | G01M 15/14 |
| 2006/0031001 | A1 | 2/2006 | Snowbarger et al. | |
| 2007/0199315 | A1 * | 8/2007 | Grossart | F15B 21/14 60/413 |
| 2014/0303865 | A1 | 10/2014 | Bohm | |
| 2018/0180069 | A1 * | 6/2018 | Wagner-Stuerz | F15B 5/006 |
| 2019/0226959 | A1 * | 7/2019 | Rampen | F03C 1/0435 |

FOREIGN PATENT DOCUMENTS

| | | |
|---|---|---|
| CN | 104024966 A | 9/2014 |
| EP | 2 371 586 A1 | 10/2011 |
| JP | H11-194825 A | 7/1999 |
| JP | 2001-280301 A | 10/2001 |
| JP | 3595554 B2 | 12/2004 |
| JP | 2008-251048 A | 10/2008 |
| WO | 2013/101097 A1 | 7/2013 |

OTHER PUBLICATIONS

Jan. 2, 2019 International Preliminary Report on Patentability isssused in International Patent Application No. PCT/FI2016/050655.

Jul. 28, 2020 Office Action issued in Korean Patent Application No. 10-2019-7011350.

Sep. 16, 2019 Extended Search Report issued in European Patent Application No. 16916715.2.

Aug. 23, 2021 Office Action issued in Chinese Application No. 201680090553.8.

\* cited by examiner

ACTUATOR OF A PROCESS DEVICE HAVING A CONTROLLER CONFIGURED TO OPERATE IN A MEASURED POSITION FEEDBACK MODE AND A SIMULATED POSITION FEEDBACK MODE

FIELD OF THE INVENTION

The invention relates to a control of actuators, particularly pneumatic and hydraulic actuators.

BACKGROUND OF THE INVENTION

Actuators are frequently used as mechanisms to introduce motion or control motion. It is operated by a source of energy, typically electric current, hydraulic fluid pressure, or pneumatic fluid pressure, and converts that energy into motion of a target mechanism, such as into movement of a closure element of a control valve.

A control valve is generally used for a continuous control of a liquid or gas flow in different pipelines and processes. In a processing industry, such as oil and gas, mining, pulp and paper and chemical industries, different kinds of control valves installed in a plant's pipe system control material flows in the process. A material flow may contain any fluid material, such as fluids, liquors, liquids, gases and steam. The operation of a control valve involves positioning its movable or closing part (e.g. the plug, ball or disc) relative to the stationary seat of the valve. The control valve is usually connected with an actuator whose purpose is to accurately locate the closing element of the valve in a position dictated by a control signal. The actuator moves the closing element of the valve to a desired position between fully open and fully closed positions. The actuator may be a pneumatic or a hydraulic cylinder-piston device, for example. The actuator, for its part, is usually controlled by a valve positioner, also called as a valve controller, for controlling the position of the closing element of the control valve and thus the material flow in the process according to a control signal from a process controller. A position sensor (such as a potentiometer) feeds a signal representing the actual valve position to the positioner. In this way the actuator can be positioned along its stroke in proportion to the control signal. Hence the positioner operates as a feedback controller.

One of the newer devices that offer improved performance of control valves is so-called "smart" positioner or a digital valve controller. One example of a smart positioner is the Neles NDX valve controller manufactured by Metso Corporation. A smart positioner is a microprocessor-based electronic positioner with internal logic capability which derives benefit from digital programming to obtain improved positioning performance. An advantage of the smart positioner is that it may be programmed to use a position control algorithm to achieve better dynamic response. Further, the smart positioner may use 2-way communications protocols such Hart, Foundation Fieldbus, etc. to communicate with a process control system.

Typically a position sensor is integrated to the valve positioner or controller which must be attached to the actuator and the valve. However, there are also arrangements wherein a separate position sensor is attached to an actuator or a valve, and the position measurement is communicated to a positioner, which is mounted remotely.

In both cases a failure in a valve position feedback, such as in the position sensor, may render the feedback control and the valve inoperative. U.S. Pat. No. 7,222,016 discloses an arrangement wherein a secondary pressure feedback controller is provided to back up a primary position feedback controller. In the event of a failure associated with the position feedback control, the secondary controller with a pressure feedback is taken into use for ensuring continued operation of the control valve. A switch which transfers the control from the primary controller to the secondary controller can be manually operated or it may automatically react to position sensor failures. A disadvantage of this approach is that an additional secondary (pressure feedback) controller must be configured and tuned.

BRIEF DESCRIPTION OF THE INVENTION

Aspects of the invention are recited in the attached independent claims. Embodiments of the invention are disclosed in the dependent claims.

An aspect of the invention is a method of controlling a pneumatic or hydraulic actuator of a process device, comprising controlling a pneumatic or hydraulic actuator of a process device in a simulated feedback mode, wherein an actuator pressure is measured, a simulated position of the actuator or the process device is derived from the measured actuator pressure by a simulation model, and a position of the actuator or the process device is controlled based on a setpoint position and the simulated position.

In an embodiment, the method further comprises controlling the pneumatic or hydraulic actuator of the process device in a measured feedback mode wherein a measured position of the actuator or the process device is obtained from a position sensor, and the position of the actuator or the process device is controlled based on the setpoint position and the measured position.

An aspect of the invention is method of controlling a pneumatic or hydraulic actuator of a process device, comprising controlling a pneumatic or hydraulic actuator of a process device in a measured feedback mode wherein a measured position of the actuator or the process device is obtained from a position sensor, and the position of the actuator or the process device is controlled based on the setpoint position and the measured position, wherein an actuator pressure is measured, a simulated position of the actuator or the process device is derived from the measured actuator pressure by a simulation model, and a failure of the position measurement is detected when an error between simulated and measured position value exceeds a predefined limit.

In an embodiment, the simulation model is a dynamic simulation model that models a time-varying behaviour of a position as a function of the actuator pressure.

In an embodiment, the simulation model takes into account a time constant of change of the position as a function of the actuator pressure.

In an embodiment, the simulation model includes a non-linear part providing simulated steady-state position values as a function of the actuator pressure, and a linear dynamic element, characterized by time constant, which determines the speed of the simulated position feedback.

In an embodiment, the method further comprises controlling the position of the actuator or the process device in the simulated feedback mode when there is a failure in the position sensor.

In an embodiment, the method further comprises controlling the actuator primarily in the measured feedback mode, and controlling the actuator in the simulated feedback mode in response to a failure in receiving the measured position.

In an embodiment, the method further comprises indicating to a user the use of the measured feedback mode or the simulated feedback mode and/or the failure in receiving the measured position of the actuator.

In an embodiment, the method further comprises determining parameters of the simulation model automatically during a configuration of an actuator control, said determining preferably including measuring a position of the actuator by a position sensor for each measured actuator pressure during a test stroke of the actuator.

In an embodiment, the method further comprises controlling in the simulated feedback mode an actuator having no position sensor.

In an embodiment, the method further comprises determining parameters of the simulation model manually during a configuration of an actuator control, said determining preferably including a visual inspection of the position of the actuator for each measured actuator pressure during a test stroke of the actuator.

An aspect of the invention is a controller for controlling a pneumatic or hydraulic actuator of a process device, comprising
 a position feedback signal input for receiving a position sensor signal representing a position of the actuator or the process device,
 an actuator pressure output,
 means for obtaining for an actuator pressure measurement,
 a control unit having at least a first control mode and a second control mode, wherein the control unit in the first control mode is arranged to control the actuator on the basis of a setpoint position and the received position sensor signal, and wherein the control unit in the second control mode is arranged to control the actuator based on the setpoint position and a simulated position of the actuator or the process device, the simulated position being derived from the measured actuator pressure by a simulation model.

An aspect of the invention is a controller for controlling a pneumatic or hydraulic actuator of a process device, comprising
 a position feedback signal input for receiving a measured position signal representing a position of the actuator or the process device,
 an actuator pressure output,
 means for obtaining an actuator pressure measurement,
 a control unit arranged to control the actuator dependent on a setpoint position and the measured position,
 the control unit is arranged to derive a simulated position of the actuator or the process device from the measured actuator pressure by a simulation model, and
 the control unit is configured to detect a failure in the position measurement when an error between simulated and measured position value exceeds a predefined limit.

In an embodiment, the process device is a valve, particularly a control valve.

An aspect of the invention is a controller configured to implement the control method.

An aspect of the invention is use of the controller according to any embodiment of the invention in controlling an actuator and a process device without a position sensor.

An aspect of the invention is a process device, particularly a control valve, controlled according to any embodiment of the invention.

BRIEF DESCRIPTION OF THE DRAWINGS

In the following the invention will be described in greater detail by means of preferred embodiments with reference to the attached drawings, in which.

EXAMPLE EMBODIMENTS OF THE INVENTION

Figure 1:
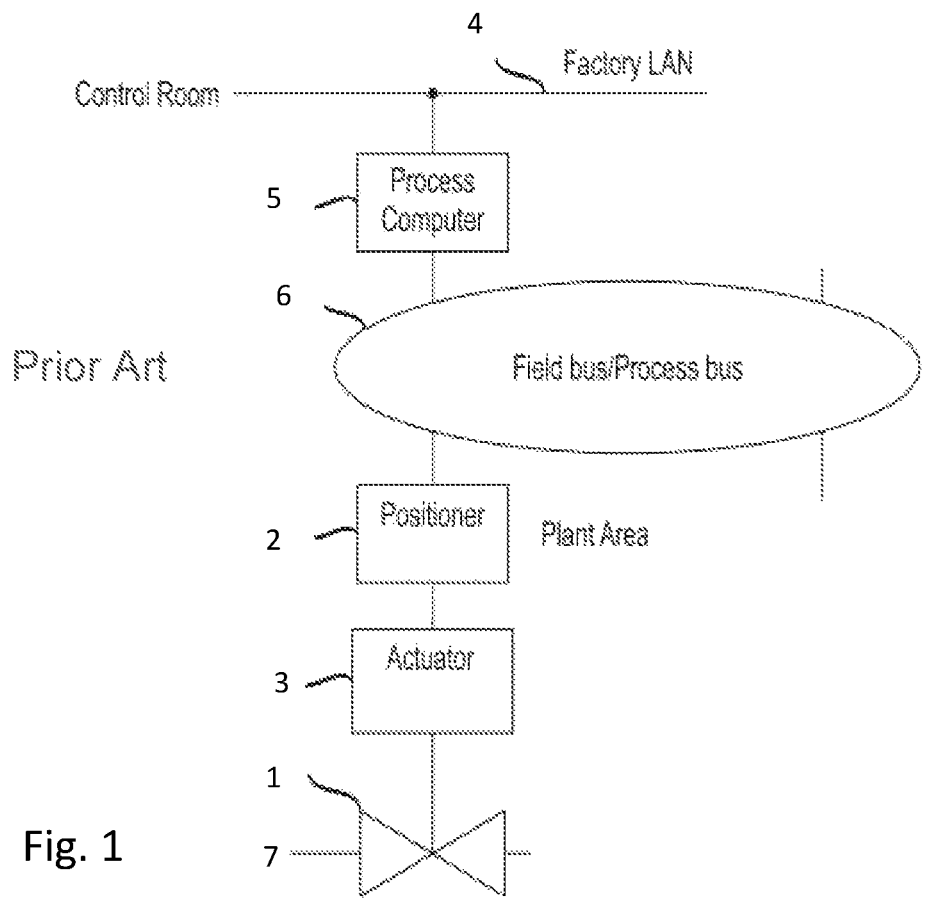
FIG. 1 shows a schematic block diaphragm of an exemplary process automation system.

FIG. 1 shows a schematic block diaphragm of an exemplary process automation system wherein the principles of the invention may be applied in a valve positioner. The control system block 5 generally represents any and all control room computer(s)/programs and process control computer(s)/programs as well as databases, which may be interconnected by a factory LAN 4, in the automation system. There are various architectures for a control system. For example, the control system may be a Direct Digital Control (DDC) system or Distributed Control System (DCS), both well known in the art. It should be appreciated that the type or architecture of the automation system is not relevant to the present invention.

In the example of FIG. 1, a control valve assembly comprising a process valve 1 and a positioner 2 and an actuator 3 may be connected to a process to control the flow of a substance in a process pipeline 7. Material flows of a process or process pipeline may be controlled in a processing industry, such as oil and gas, mining, pulp and paper, and chemical industries. The material flow may contain any fluid material, such as fluids, liquors, liquids, gases and steam. Although only one controlled process valve assembly is shown in FIG. 1, an automation system may, however, include any number of field devices, such as control valve assemblies, often hundreds of them. An example of a process valve 1 is Neles® RotaryGlobe control valve from Metso Corp. An example of a valve positioner 2 wherein embodiments of the invention may be applied is Neles® NDX valve controller manufactured by Metso Corporation. An example of an actuator 3 is Quadra-Power X series pneumatic actuator from Metso Corp.

There are various alternative ways to arrange the interconnection between the control system and field devices, such as control valves, in a plant area. In FIG. 1, the field/process bus 6 generally represents any such interconnection. Traditionally, field devices have been connected to the control system by two-wire twisted pair loops, each device being connected to the control system by a single twisted pair providing a 4 to 20 mA analog input signal. More recently, new solutions, such as Highway Addressable Remote Transducer (HART) protocol, that allow the transmission of digital data together with the conventional 4 to 20 mA analog signal in the twisted pair loop have been used in the control systems. The HART protocol is described in greater detail for example in the publication HART Field Communication Protocol: An Introduction for Users and Manufacturers, HART Communication Foundation, 1995. The HART protocol has also been developed into an industrial standard. Examples of other fieldbuses include Foundation Fieldbus and Profibus PA. However, it is to be understood that the type or implementation of the field/process bus 3 is not relevant to the present invention. The field/process bus 6 may be based on any one of the alternatives described above, or on any combination of the same, or on any other implementation.

Figure 2A:
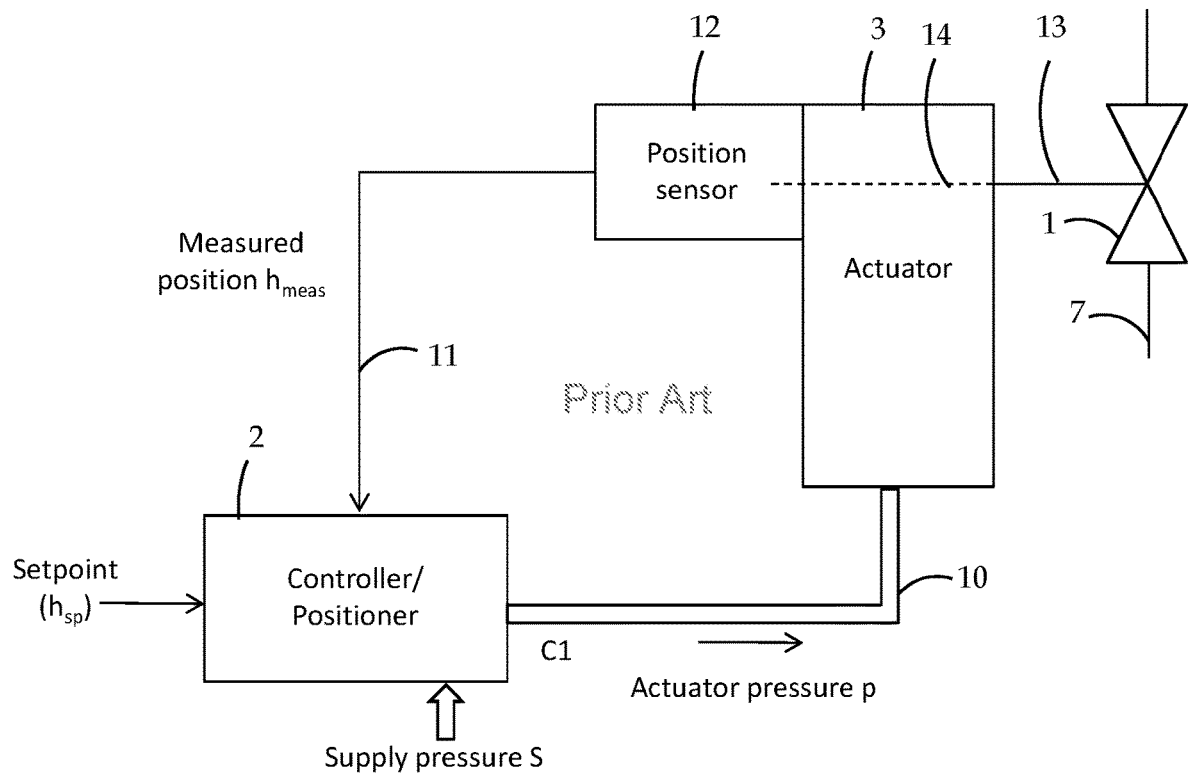
FIG. 2A shows a schematic block diagram of an exemplary control valve assembly.

FIG. 2A illustrates a schematic block diagram of an exemplary control valve assembly wherein a pneumatic actuator 3 operates the process valve 1 under control of the valve positioner or controller 2. The operation of an intelligent (smart) valve positioner, such as the positioner 2, may be based on a microcontroller, such as a microprocessor (µP). The positioner or controller 2 controls the position of the valve 1. To that end, the positioner may receive an input signal (e.g. a setpoint) over a process/fieldbus 6, such as 4-20 mA pair and HART, and may perform various measurements.

The positioner 2 may be provided with valve or actuator position h measured by a position sensor 12 attached to the actuator 3 and/or the valve 1. The position sensor 12 may be provided to measure the position of the actuator or valve and to feed a position signal h representing the actual valve or actuator position back to the positioner 2. For example, the sensor 12 may be arranged to measure the rotation or linear movement of the shaft 14 of an actuator 3. For example, the sensor 12 may comprise a potentiometer (an adjustable resistor) whose resistance may vary with the position h of the actuator 3 or valve 1. The position sensor 12 may be integrated into the positioner 2, if the positioner 2 is attached to the actuator 3. In implementations in which the positioner 2 is located separate or remote from the actuator 3 and the valve 1, the positioner 2 may receive the signal representing the measured actuator/valve position $h_{meas}$ over a wired or wireless connection 11.

The positioner 2 may also be connected to a supply of compressed air S supplying air at supply pressure $p_{supply}$ from which the positioner 2 is arranged to provide an actuator pressure $p_{actuator}$ for controlling the actuator 3 so as to position the valve 1. The pressurized air for the actuator, i.e. the pneumatic actuator pressure $p_{actuator}$, may be provided at an actuator pressure port C1 and delivered through an actuator pressure line or pipe 10 to the pneumatic actuator 3. The actuator 3 may convert the pneumatic actuator pressure $p_{actuator}$ into a rotation or linear motion of the valve stem 14 by pressure acting on a diaphragm or piston connected to the stem 14. The actuator 3 may be either single-acting or double-acting. With the single-acting devices, movement in the opposite direction is effected by a spring, and the pneumatic actuator pressure p is working against the spring. When pneumatic pressure p closes the valve and spring action opens the valve 1, the actuator is termed direct acting. When the pneumatic pressure p opens the valve and spring action closes the valve, the actuator is termed reverse acting. Double-acting actuators have pressurized air supplied to both sides of the diaphragm or the piston. The differential pressure across the diaphragm or the piston positions the valve stem 14. In alternative implementations, hydraulic actuators may be employed for positioning of the valve similar to the pneumatic actuators, but now a hydraulic fluid is used instead of air or a pneumatic fluid.

The positioner or controller 2 may control the valve position according to a predetermined feedback control method based on the feedback measured position $h_{meas}$ and the desired target position, setpoint, $h_{sp}$. An example of a feedback control loop is illustrated schematically in FIG. 2B. The setpoint $h_{sp}$ may be defined by a control signal received from a process control system. For example, the positioner or controller 2 may determine a difference or error between the setpoint $h_{sp}$ and the position $h_{meas}$ measured by the position sensor 12. Based on the error or difference the positioner 2 may then change the air flow or pneumatic actuator pressure $p_{actuator}$ to position the actuator 3 and/or the valve 1 to correct position h so that the difference or the error is reduced to zero. Thus, it can be said that the positioner is a feedback controller. As the setpoint signal and the position feedback signal typically are electrical signals, and the positioner may typically be an electronic unit (e.g. microcontroller) for implementing the feedback control method and providing an electrical control output (e.g. an error signal), the positioner 2 may also contain a prestage for an electric-to-pressure (I/P) conversion of the electrical control signal into a corresponding pilot pressure which may control a power output stage to vary the air flow or pneumatic actuator pressure $p_{actuator}$ at the actuator port C1 connected to the actuator 3. Hence it may be said that the positioner 2 is a pneumatic or hydraulic feedback controller.

A failure in a valve position feedback, such as in the position sensor 12, may render the feedback control and the valve 1 inoperative. Further, applications of this type of controller are limited, because in practice only process devices, such as control valves, with suitable brackets and position feedback can be controlled. Also the linear measurement range is limited, which further limits applications of this type of positioner or controller.

An aspect of the invention is a new control strategy for an actuator position control.

An aspect of the invention is to replace a measured position feedback with a simulated position feedback when the measured position is inaccessible or unavailable. By replacing the feedback position sensor value with the simulated position, an ordinary valve positioner can be used without a position sensor feedback. This opens up new remote mounting possibilities, new unlimited stroke length control, a fault-tolerant valve control, and new opportunities to use valve positioners for other purposes than valve control. Any pneumatically or hydraulically actuated device with or without a position sensor can be controlled. For a fault-tolerant valve control, only one feedback controller must be configured and tuned.

An aspect of the invention is deriving a simulated actuator position h from a measured actuator pressure $p_{actuator}$ output from the positioner or controller 2.

Figure 3:
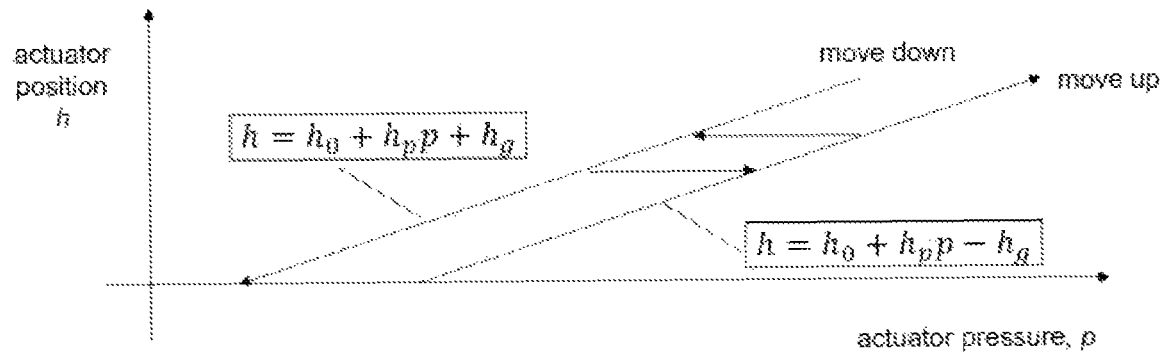
FIG. 3 shows an example of an actuator travel model for a spring-return actuator.

An aspect of the invention is a simulation model that models an actuator travel, i.e. a position h of the actuator 3, as a function of an actuator pressure $p_{actuator}$. In an exemplary embodiment, an actuator pressure/position signature curve is used to provide a simulated position h from an actuator pressure $p_{actuator}$. An example of an actuator travel model for a spring-return actuator (single acting, direct or reverse acting actuator) is illustrated in FIG. 3. For a spring-return actuator the actuator travel model may typically be linear with backlash. In the example we have a three parameter model with parameters: $h_0$=start position, $h_p$= (angular) coefficient, and $h_g$=backlash. An opening curve (move up) and a closing curve (move down) are shown which are substantially parallel and linear throughout the full stroke. The separation of the curves is the backlash hg resulting from the friction which opposes motion. In the example, the simulated actuator position has a function of an increasing actuator pressure $p_{actuator}$ is illustrated with the move-up curve and may be derived according to an equation 1:

$$h = h_0 + h_p p - h_g \quad (1)$$

Similarly, the simulated actuator position has a function of a decreasing actuator pressure $p_{actuator}$ is illustrated with the move-down curve and may be derived according to an equation 2:

$$h = h_0 + h_p p + h_g \quad (2)$$

A linear model of an actuator travel, such as the liner model with backlash obtained by equations (1) and (2), basically gives a steady-state value for the position has a function to the actuator pressure. However, in embodiments of the present invention simulation may be dynamic, wherein also the time varying behaviour of a system is modeled. The simulation may incorporate real-world constraints, such as a valve backlash or valve speed, meaning that a simulation model becomes nonlinear. The valve speed may be defined as a speed with which a valve and/or an actuator reaches a steady-state position upon change of the control parameter. Typically there is a characteristic delay or response time, i.e. time constant T from a measurement time of a specific value of an actuator pressure $p_{actuator}$ to a time instant where the real position of the valve or actuator has reached the corresponding steady-state position given by the equations (1) and (2), for example. Therefore, more accurate and stable position control can be achieved by taking dynamic constraints into account in the position simulation.

In an exemplary embodiment a steady state position h is subjected to a non-linear processing that models a time-varying behaviour of a real position as a function of an actuator pressure $p_{actuator}$. In an embodiment the non-linear processing is performed by an exponential function or a $1^{st}$ order or $2^{nd}$ order filter. An exemplary non-linear processing may perform the equation (3) a position h obtained from the linear model of Equations (1) and (2):

$$h_{sim}(k) = a\, h_{sim}(k-1) + (1-a) h(k) \quad (3)$$

wherein $$a = e^{(-T_s/T)} \quad (4)$$

$T_s$ = sample time
T = time constant
k = index, integral number

A simulation model, more specifically parameter values for the simulation model, can be determined in various ways depending on an application in question. For example, in embodiments of the invention wherein a simulated position is used for a fault-tolerant control of an actuator provided with a position sensor, a simulation model can be determined during a normal configuration and controller tuning when a position feedback is operative, e.g. the position sensor is operating normally. For example, with a test stroke a sufficient number of pairs of actuator position h and actuator pressure $p_{actuator}$ are measured to determine the parameters $h_0$, $h_p$ and $h_g$ for a simulation model. As further example, the time constant T can be determined by registering a response time between a measured actuator pressure and a corresponding steady-state position h.

In embodiments of the invention wherein a simulated position is used for control of an actuator without a position sensor, the positioner or controller is always run in open-loop without the measured position feedback. The control is always based on the simulated position values. Without a position measurement, a simulation model can be obtained, for example, manually, automatically during a manual calibration, or with a separate identification experiment. In an embodiment, a simulation model may be obtained manually by assessing the parameter values (e.g. $h_0$, $h_p$ and $h_g$) from a valve signature of a previous positioner installation. In an embodiment, obtaining a simulation model automatically during manual calibration may include registering actuator pressures at valve end points (open/close) to identify parameters $h_0$ and $h_p$, and setting a default value for the parameter $h_g$. In an embodiment, a simulation model may be obtained with a separate identification experiment which may include moving the actuator in both opening and closing directions, a visual inspection of a valve or actuator position, measuring an actuator pressure $p_{actuator}$, and registering a sufficient number of pairs of a visually-identified valve or actuator position h and a measured actuator pressure $p_{actuator}$.

Figure 4:
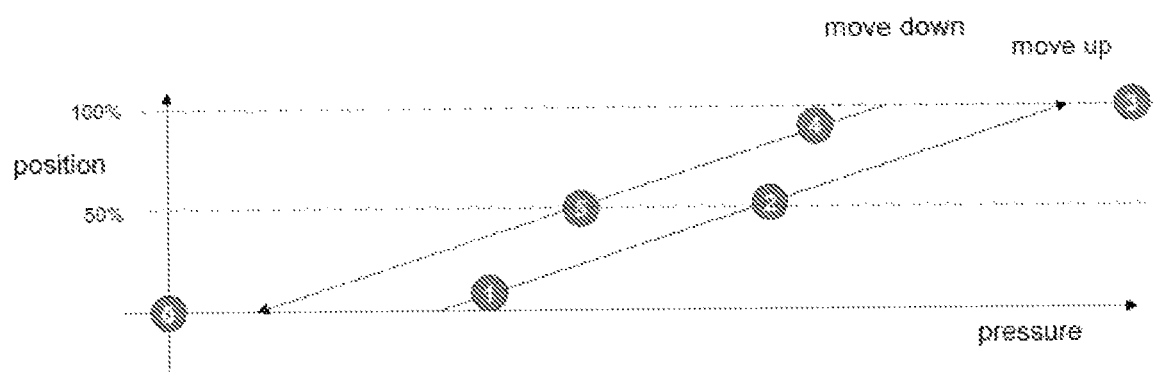
FIG. 4 shows an exemplary modeling procedure that may be performed for an installed valve positioner.

An exemplary modeling procedure that may be performed for an installed valve positioner in a plant is illustrated in FIG. 4. It is assumed that the user can move the actuator 3, e.g. by modifying actuator pressure through a user interface or otherwise, and that the actuator or valve position h can be visually examined. The user interface may be configured to guide or prompt to make preset actions in predetermined sequence. Referring to FIG. 4, the exemplary sequence that will find a simulation model may be as follows:

0. Start with an ambient pressure (closed valve)
1. Ask user to slightly open the valve
2. Ask user to open the valve to 50%
3. Ask user to drive to max pressure
4. Ask user to slightly close the valve
5. Ask user to close the valve to 50%

A pair of a visually-identified actuator or valve position h and a measured actuator pressure $p_{actuator}$ is registered in each sequence step, and the parameters $h_0$, $h_p$ and $h_g$ are calculated for a simulation model.

Figure 5:
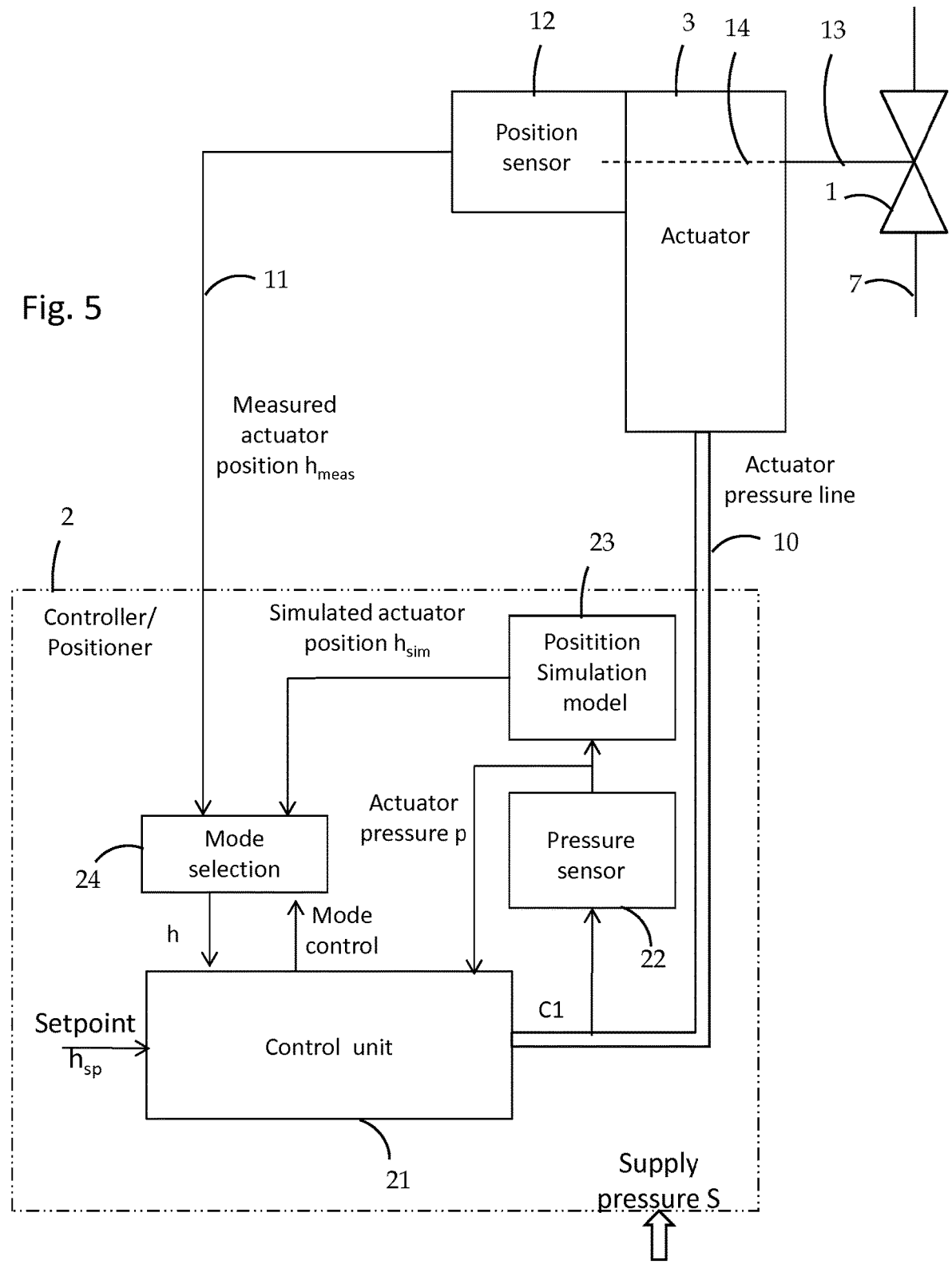
FIG. 5 shows a schematic block diagram of an exemplary valve positioner or controller according to an embodiment of the invention.

FIG. 5 illustrates a schematic block diagram of an exemplary valve positioner or controller 2 configured to replace a measured position feedback with a simulated position feedback when the measured position is inaccessible or unavailable. In the example of FIG. 5, the valve positioner or controller 2 is used for controlling a control valve assembly having a pneumatic actuator 3 and a process valve 1, but alternatively any pneumatically or hydraulically actuated device with or without a position sensor can be controlled. In FIGS. 2 and 5, same reference symbols refer to same structures and functions. In order to avoid repetition, mostly only new or different structures are described in the following.

In the example of FIG. 5, a pressure sensor 22 may be provided to measure the actuator pressure $p_{actuator}$ at the actuator port C1 or along the actuator pressure line 10 or at the actuator 3. The measured value of the actuator pressure $p_{actuator}$ from the pressure sensor 22 may be fed to a control unit 21 of the positioner or controller 2, and also to a position simulation unit 23. The position simulation unit 3 may provide a simulated position h of the actuator or valve using a position simulation model, for example one of the exemplary models described above. The control unit 21 may represent the normal configuration and functionality of the positioner or controller 2. The operation of the control unit 21 may be based on a microcontroller, such as a microprocessor (μP), and it may also contain a prestage for an electric-to-pressure (I/P) conversion of an electrical control signal into a corresponding pilot pressure which may further control a power output stage to vary the actuator pressure $p_{actuator}$ at the actuator pressure port C1.

The positioner 2 may also have a position feedback input configured to receive a position feedback signal representing the actual valve or actuator position $h_{meas}$ measured by a position sensor 12 attached to the actuator 3 and/or the valve 1. The measured position signal $h_{meas}$ may be fed to a first input of a mode selection unit 24, while the simulated position $h_{sim}$ from the position simulation unit 23 may be fed to a second input of the mode selection unit 24. The mode selection unit 24 may select one of the measured position signal $h_{meas}$ and the simulated position signal $h_{sim}$ as the position signal to be used by the control unit 21. The selection unit 24 may be controlled by the control unit 21, e.g. with a mode control signal.

Figure 2B:
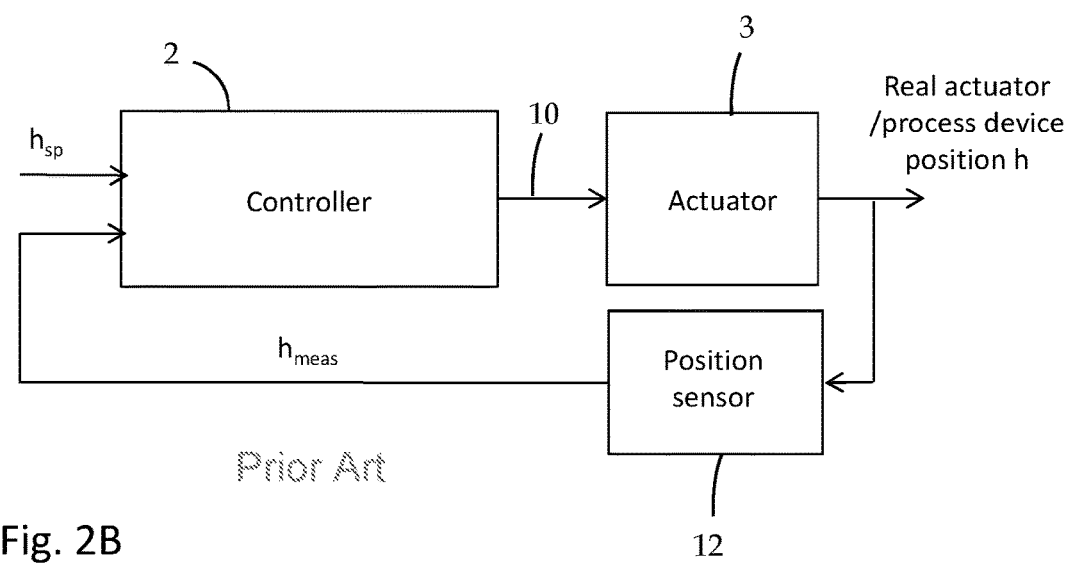
FIG. 2B shows a schematic block diagram of an exemplary feedback control loop.

In the example, the positioner or controller 2 may have at least two modes: a measured feedback mode and a simulated feedback mode. In the measured feedback mode, the positioner or controller 2 may use the measured position feedback $h_{meas}$ for the control, for example as illustrated in FIG. 2B. The mode selection unit 24, e.g. in response to a first state of the mode control from the control unit 21, will select or connect the measured position signal $h_{meas}$ at the first input to be the position signal h for the control unit 21. In the measured feedback mode, the control unit 21 may control the actuator or valve position according to a predetermined feedback control method based on the feedback measured position $h_{meas}$ and the desired target position, setpoint, $h_{sp}$. For example, the control unit 21 may determine a difference or error between the setpoint and the position h measured by the position sensor 12. Based on the error or difference the control unit 21 may then change the actuator pressure to correct the position so that error is reduced to zero.

In the measured feedback mode, the control unit 21 may monitor the presence or quality of the measured position signal h. For example the control unit 21 may compare the measured position value with the simulated position value, and determining a loss or bad quality of the measured position value when an error between simulated and measured position value exceeds a predefined limit. In response to a loss or bad quality of the measured position signal h, the control unit 21 may automatically assume the simulated feedback mode. In the simulated feedback mode, the positioner or controller 2 may use the simulated position feedback $h_{sim}$ for the control. The mode selection unit 24, e.g. in response to a second state of the mode control from the control unit 21, will select or connect the simulated position signal $h_{sim}$ at the first input to be the position signal h for the control unit 21. In the simulated feedback mode, the control unit 21 may control the actuator or valve position according to a predetermined feedback control method based on the 'feedback' simulated position $h_{sim}$ and the desired target position, setpoint, $h_{sp}$. For example, the control unit 21 may determine a difference or error between the setpoint $h_{sp}$ and the simulated position $h_{sim}$ provided by the position simulation unit 23. Based on the error or difference the control unit 21 may then change the actuator pressure to correct the position so that error is reduced to zero.

Figure 6:
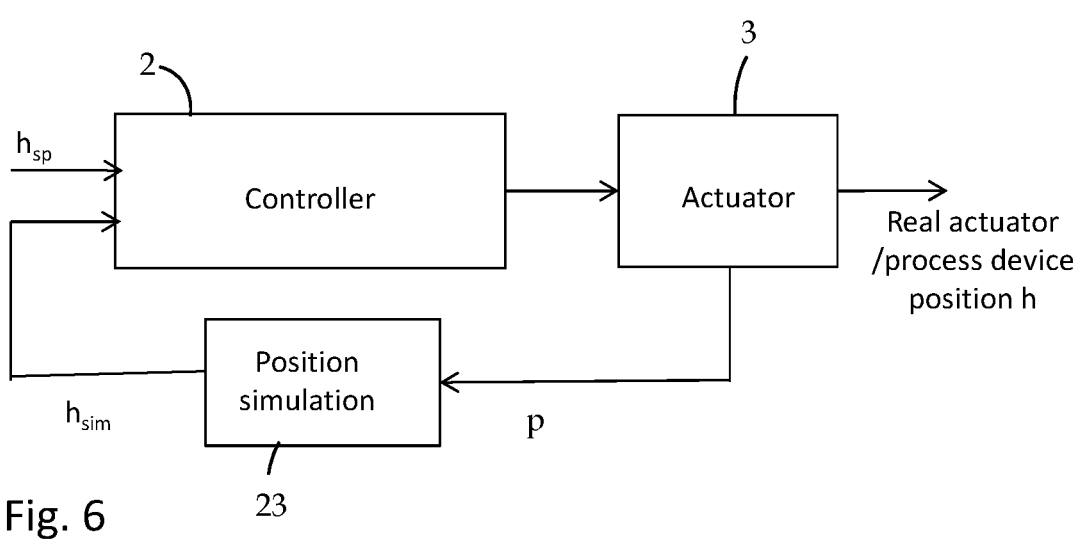
FIG. 6 shows a schematic block diagram of a simulated feedback control loop according to an exemplary embodiment of the invention.

The simulated position feedback results in a novel position feedback control loop wherein the control simulates an "operating parameter", valve position, which is the primary controlled variable and which has an external setpoint. A schematic block diagram of a simulated feedback control loop according to an exemplary embodiment of the invention is illustrated in FIG. 6. No measurement of the controlled variable, i.e. the position, is used or needed in the simulated feedback mode. Further, an actuator pressure is used as a "state variable", i.e. a help variable that is used internally by the controller but do not have an external setpoint. We do not simulate this variable, but we expect that we can measure it. The idea that we replace the main controlled variable with its simulated version is innovative or even radical by itself. In 99% of control applications, measured values are used as controlled variables, and the rest 1% are some kind of ratios or differences or other values derived from physical measurements. Virtual/simulated variables are, in practice, never utilized.

In an embodiment, the simulated feedback mode and/or measured feedback mode may be user-selectable locally via a user interface of the positioner or controller 2.

In an embodiment, the simulated feedback mode and/or the measured feedback mode may be user-selectable remotely over a process/fieldbus 6, such as 4-20 mA pair and HART.

In an embodiment, the positioner or controller 2 may be configured to indicate an absence of the measured position signal, a failure of a position sensor and/or a transition to or use of the simulated feedback mode to the user locally via a user interface of the positioner or controller 2 and/or to a remote control room over a process/fieldbus 6.

In an embodiment, the positioner or controller 2 may be configured to operate only in the simulated feedback mode for controlling a pneumatically or hydraulically actuated device which does not have any position sensor. In the simulated feedback mode, there are no position sensor limitations in terms or linear range or rotary range or other any other shape of movements. The control in the simulated feedback mode is actually an open-loop control, and therefore hunting of the control will not occur for stuck actuator.

It will be obvious to a person skilled in the art that, as the technology advances, the inventive concept can be implemented in various ways. The invention and its embodiments are not limited to the examples described above but may vary within the scope of the claims.

The invention claimed is:

1. A method of controlling, comprising
controlling a pneumatic or hydraulic actuator of a process device in a simulated feedback mode, wherein
an actuator pressure is measured,
a simulated position feedback of the actuator or the process device is derived from the measured actuator pressure by a simulation model, and
a position of the actuator or the process device is controlled based on a setpoint position and the simulated position feedback, and
controlling the pneumatic or hydraulic actuator of the process device in a measured feedback mode wherein
a measured position feedback of the actuator or the process device is obtained from a position sensor, and
the position of the actuator or the process device is controlled based on the setpoint position and the measured position feedback.

2. The method as claimed in claim 1, wherein the simulation model is a dynamic simulation model that models a time-varying behaviour of a position as a function of the actuator pressure.

3. The method as claimed in claim 1, wherein the simulation model takes into account a time constant of change of the position as a function of the actuator pressure.

4. The method as claimed in claim 1, wherein the simulation model includes a non-linear part that provides simulated steady-state position values as a function of the actuator pressure, and a linear dynamic element, characterized by time constant, which determines the speed of the simulated position feedback.

5. The method as claimed in claim 1, comprising one or more of:
controlling the actuator primarily in the measured feedback mode; or
controlling the actuator in the simulated feedback mode in response to a failure in receiving the measured position feedback; or
controlling in the simulated feedback mode when there is a failure in the position sensor; or
controlling in the simulated feedback mode when an error between the simulated position feedback and measured position feedback exceeds a predefined limit; or
controlling in the simulated feedback mode an actuator having no position sensor.

6. The method as claimed in claim 1, comprising indicating to a user the operation in the measured feedback mode, the operation in the simulated feedback mode, and/or a failure in receiving the measured position feedback of the actuator.

7. The method as claimed in claim 1, comprising one or more of;
determining parameters of the simulation model automatically during a configuration of an actuator control, said determining preferably including measuring a position of the actuator by a position sensor for each measured actuator pressure during a test stroke of the actuator; or
determining parameters of the simulation model manually during a configuration of an actuator control, said determining preferably including a visual inspection of the position of the actuator for each measured actuator pressure during a test stroke of the actuator.

8. A controller for controlling a pneumatic or hydraulic actuator of a process device, comprising
a position feedback signal input for receiving a measured position feedback signal representing a position of the actuator or the process device,
an actuator pressure output,
means for obtaining an actuator pressure measurement,
a control unit having at least a first control mode and a second control mode, wherein the control unit in the first control mode is arranged to control the actuator dependent on a setpoint position and the measured position feedback, and wherein the control unit in the second control mode is arranged to control the actuator based on the setpoint position and a simulated position feedback of the actuator or the process device, the simulated position feedback being derived from the measured actuator pressure by a simulation model.

9. The controller as claimed in claim 8, wherein the controller is configurable to operate primarily in the first control mode, and wherein the controller is configurable to change from the first control mode to the second control mode in response to detecting a failure in receiving the measured position feedback of the actuator.

10. The controller as claimed in claim 8, wherein the controller is configurable to operate primarily in the first control mode, and wherein the controller is configurable to change from the first control mode to the second control mode in response to a user command provided locally via a user interface or remotely over a control connection.

11. The controller as claimed in claim 8, wherein the controller is configurable to indicate to a user the control in the first control mode, the second control mode and/or a failure in the measured position feedback of the actuator.

12. The controller as claimed in claim 8, wherein the controller is configurable to operate only in the second control mode to control the actuator, when the actuator has no position sensor.

13. The controller as claimed in claim 8, wherein the controller is arranged to determine parameters of the simulation model automatically from a plurality of pairs of the measured position and the measured actuator pressure provided by a position sensor and a pressure sensor, respectively, during a test stroke of the actuator.

14. The controller as claimed in claim 8, wherein the controller is arranged to determine parameters of the simulation model from a plurality of pairs of an actuator position inputted by a user and the measured actuator pressure provided by the position sensor during a test stroke of the actuator.

15. The controller as claimed in claim 8, wherein the process device is a valve, particularly a control valve.

* * * * *